US009452732B1

(12) United States Patent
Hermann et al.

(10) Patent No.: US 9,452,732 B1
(45) Date of Patent: Sep. 27, 2016

(54) VEHICLE KEY OFF LOAD REDUCTION VIA OFF-BOARD SENSOR

(71) Applicant: Ford Global Technologies, LLC, Dearborn, MI (US)

(72) Inventors: Thomas Joseph Hermann, Troy, MI (US); John Robert Van Wiemeersch, Novi, MI (US); Patrick Kevin Holub, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 14/672,389

(22) Filed: Mar. 30, 2015

(51) Int. Cl.
| G06F 7/00 | (2006.01) |
| B60R 25/10 | (2013.01) |
| B60R 25/31 | (2013.01) |
| B60R 25/30 | (2013.01) |
| B60R 25/40 | (2013.01) |

(52) U.S. Cl.
CPC .............. B60R 25/10 (2013.01); B60R 25/305 (2013.01); B60R 25/31 (2013.01); B60R 25/40 (2013.01); *B60R 2025/1013* (2013.01)

(58) Field of Classification Search
USPC ...... 701/36; 340/10.34, 5.6, 10.3, 5.61, 901, 340/10.1; 380/270
See application file for complete search history.

(56) References Cited

U.S. PATENT DOCUMENTS

| 5,598,476 | A * | 1/1997 | LaBarre | H04L 9/0822 340/5.26 |
| 6,429,768 | B1 * | 8/2002 | Flick | B60R 25/04 307/10.5 |
| 7,957,900 | B2 | 6/2011 | Chowdhary et al. | |
| 8,736,678 | B2 | 5/2014 | Miller, II | |
| 2003/0102688 | A1 * | 6/2003 | Bingle | B60Q 3/06 296/76 |
| 2011/0069168 | A1 | 3/2011 | Tsou | |
| 2011/0071701 | A1 * | 3/2011 | Holub | B60W 50/0098 701/2 |
| 2012/0053754 | A1 * | 3/2012 | Pease | B60R 16/023 701/1 |
| 2016/0086397 | A1 * | 3/2016 | Phillips | G07C 5/0808 701/32.4 |

FOREIGN PATENT DOCUMENTS

| CN | 103745616 A | 4/2014 |
| WO | 2008144550 A1 | 11/2008 |

OTHER PUBLICATIONS

GoFASTandLIGHT.com, Wireless Remote Motion Detector Camp Alarm for Camp and Tent, Dec. 3, 2014.
Harbor Freight Tools, Wireless Security Alert System, Wireless Driveway Alert & Driveway Alarm System, Dec. 3, 2014.

* cited by examiner

*Primary Examiner* — Ronnie Mancho
(74) *Attorney, Agent, or Firm* — Frank MacKenzie; Brooks Kushman P.C.

(57) ABSTRACT

A remote sensing device is utilized to activate boundary alert sensors in a vehicle to reduce current loading during a key-off condition. Communication between the remote sensing device and the vehicle is via a radio-frequency interface that is part of a remote keyless entry system. The remote sensing device transmits a signal to the vehicle when an object is detected within a predetermined range of the remote sensing device. In response to the signal, the vehicle activates one or more boundary alert sensors. The boundary alert sensors may include a camera, a radar, and an ultrasonic sensor. The remote sensing device can be configured to extend a range of the radio-frequency interface by repeating messages that it receives.

20 Claims, 5 Drawing Sheets

VEHICLE KEY OFF LOAD REDUCTION VIA OFF-BOARD SENSOR

TECHNICAL FIELD

This application relates generally to vehicle power consumption in a key-off condition.

BACKGROUND

A vehicle includes various systems that may operate during an ignition-off condition. For example, a theft deterrent system may be active during the ignition-off condition to detect potential theft and generate a warning signal. Systems that are active during the ignition-off condition draw power from a battery which is not charged during the ignition-off condition. Over time, the active systems can cause the battery state of charge to fall below a threshold at which the battery can no longer provide sufficient power to start the engine. Including more electronic systems that operate during ignition-off conditions further aggravates this problem. An obvious solution might be to increase the power capability of the battery. Such a solution increases the size and weight of the battery and can affect cost, packaging, and fuel economy.

SUMMARY

A vehicle includes a boundary alert sensor and a remote keyless entry system including a radio-frequency (RF) interface. The vehicle further includes a controller programmed to, in response to the vehicle being in an ignition-off state and receiving a signal from a non-contact object detection sensor remote from the vehicle via the RF interface indicative of an object being within a predetermined range of the non-contact object detection sensor, activate the boundary alert sensor for a predetermined time interval. The boundary alert sensor includes one or more of a microphone, a camera, a radar, an infrared sensor, and an ultrasonic sensor. The controller may be further programmed to store signals received from the boundary alert sensor for the predetermined time interval. The vehicle may further include an alerting device, and the controller may be further programmed to, in response to receiving the signal, activate the alerting device for a predetermined amount of time. The alerting device may include one or more of a light and a horn. The vehicle may further include a wireless network interface. The vehicle may further include a display module, and the controller may be further programmed to, in response to receiving a video signal via the wireless network interface from the non-contact object detection sensor, activate the display module and display the video signal on the display module. The controller may be further programmed to, in response to receiving a second signal via the RF interface indicative of a request for activation of the boundary alert sensor, activate the boundary alert sensor and output data from the boundary alert sensor via the wireless network interface.

A remote sentinel device includes an object detection sensor and a radio-frequency (RF) interface configured to communicate with a remote-keyless entry system of a vehicle. The remote sentinel device further includes a controller programmed to, in response to a signal from the sensor indicative of an object being within a predetermined range of the object detection sensor, transmit a message to the vehicle via the RF interface to activate a boundary alert sensor of the vehicle. The object detection sensor may be a camera, a radar, an infrared sensor, or an ultrasonic sensor. The controller may be further programmed to, in response to receiving a remote sentinel message at the RF interface from a second remote sentinel device, transmit the remote sentinel message via the RF interface. The controller may be further programmed to, in response to receiving a vehicle message at the RF interface from the vehicle, transmit the vehicle message via the RF interface. The remote sentinel device may further include a wireless network interface. The remote sentinel device may further include a camera, and the controller may be further programmed to, in response to the signal, activate the camera and transmit video data from the camera via the wireless network interface.

The controller may be further programmed to, in response to receiving a wireless network message at the wireless network, transmit the wireless network message via the wireless network interface. The controller may be further programmed to, in response to receiving an activation message to activate the boundary alert sensor via the wireless network interface, transmit the activation message to the vehicle via the RF interface to activate the boundary alert sensor of the vehicle. The controller may be further programmed to, in response to transmitting the message greater than a predetermined number of times in a predetermined time interval, transmit an engine start command to the vehicle via the RF interface to start an engine of the vehicle. The controller may be further programmed to, in response to receiving a departure message from the vehicle via the RF interface indicative of the vehicle leaving a vicinity of the remote sentinel device, enter a low power mode to reduce power consumption.

A method of activating sensors of a vehicle includes receiving, by at least one controller, a signal indicative of motion of an object within a predetermined range of a non-contact sensing device remote from the vehicle during a key-off condition of the vehicle. The method further includes activating, by the at least one controller, one or more of the sensors of the vehicle for a predetermined time in response to the signal. The method may further include activating, by the at least one controller, a light, a horn, an audible indicator, or a visual indicator in response to the signal. The method may further include transmitting data from the one or more sensors of the vehicle via a wireless network interface. The method may further include storing, by the at least one controller, sensor data from the sensors of the vehicle for the predetermined time.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1A:
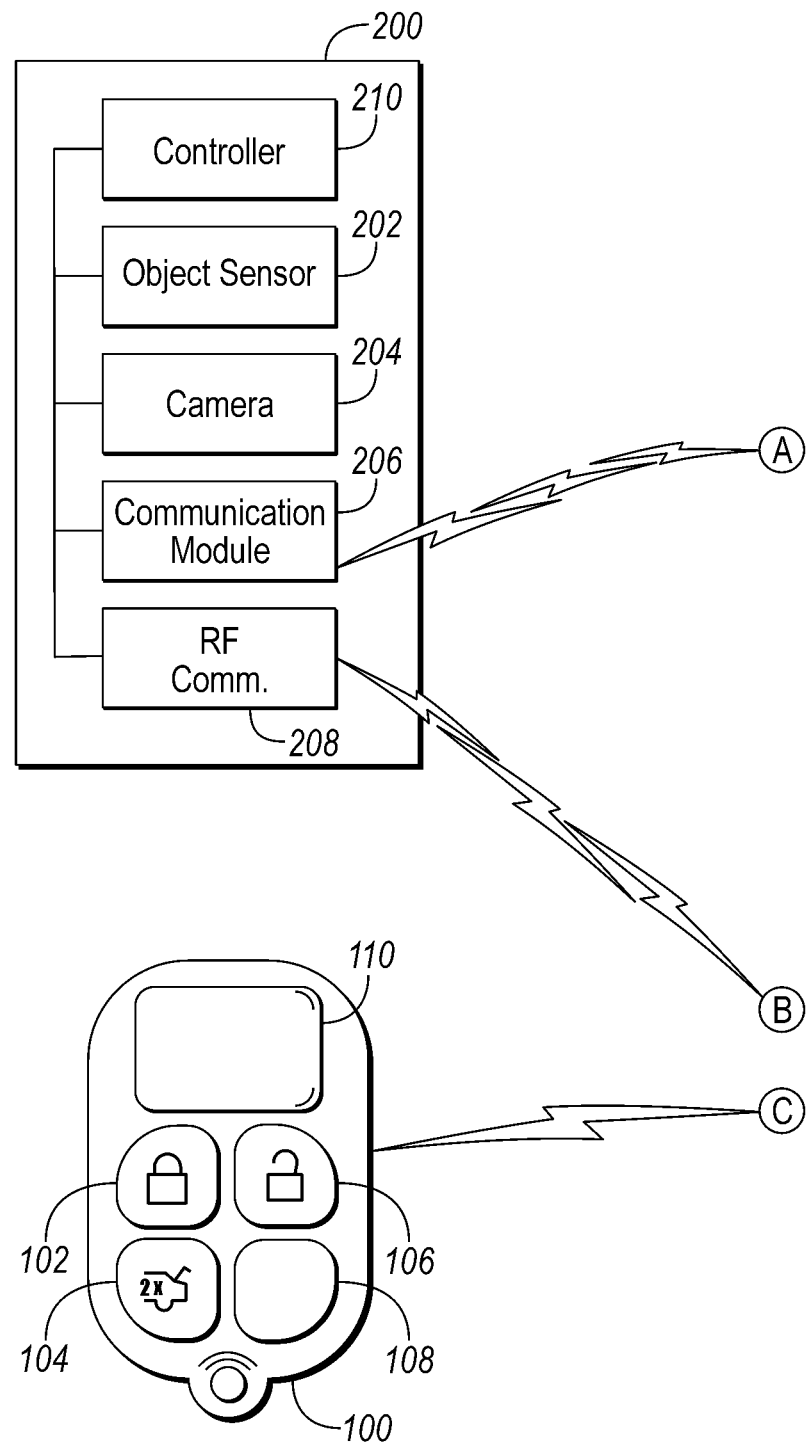
FIG. 1A depicts a possible diagram of a remote sensing device and a key fob.
Figure 1B:
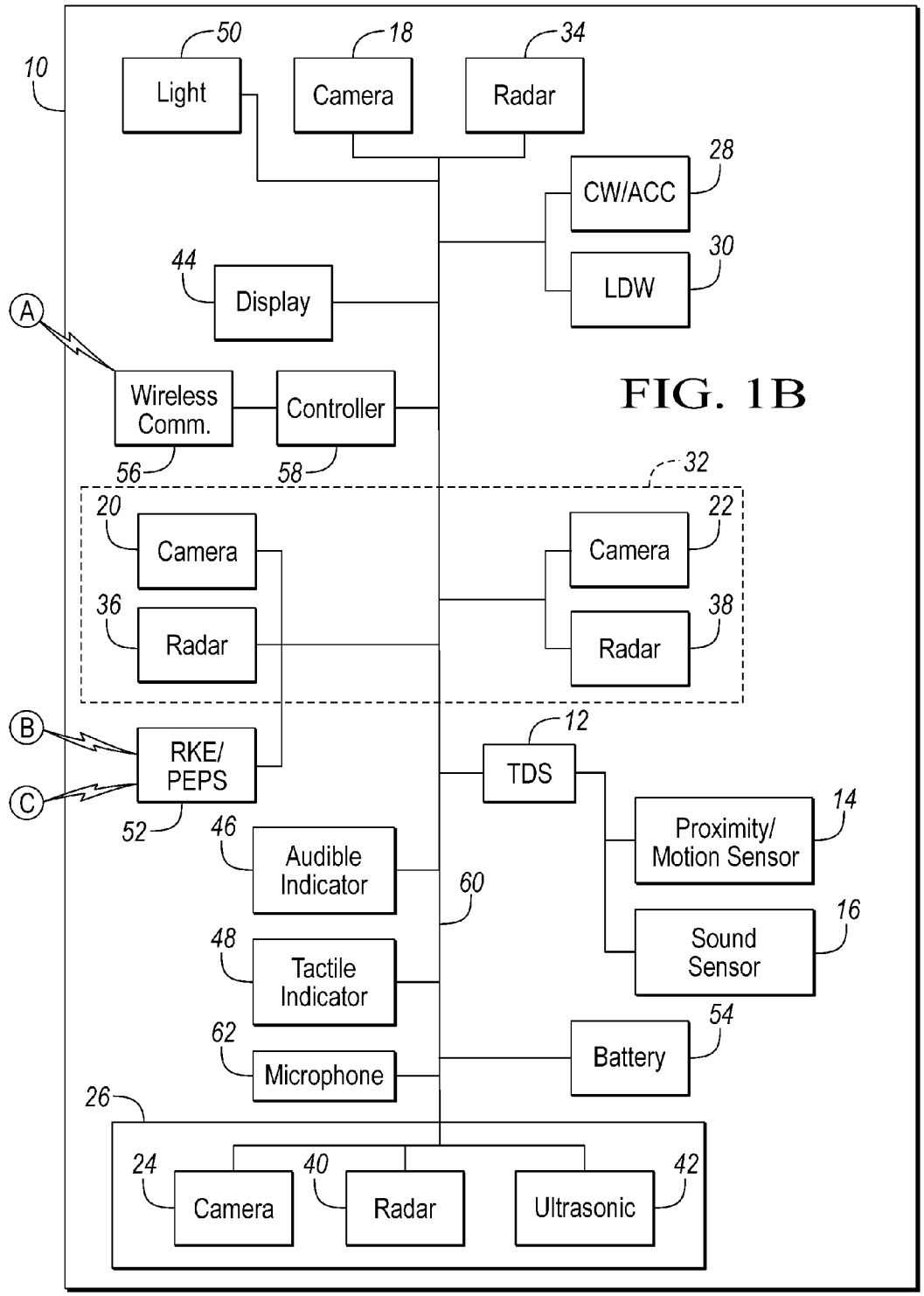
FIG. 1B depicts a possible diagram of a vehicle configured to interface with the remote sensing device and the key fob.

A vehicle 10 may be configured to provide various security related features. FIG. 1B depicts a possible vehicle configuration that includes systems that may be utilized for security related features. A vehicle 10 may include a theft-deterrent system (TDS) 12. The theft-deterrent system 12 may interface with various components to detect potential threats and generate alerts to deter theft of the vehicle 10 and its contents. The theft-deterrent system 12 may interface with a proximity or motion sensor 14 to detect movement of the vehicle 10. The motion sensor 14 may be a vibration sensor that detects vibrations of the vehicle 10 that may be caused by movement of or contact with the vehicle 10. The theft-deterrent system 12 may interface with sound or pressure sensors 16 to detect noise or pressure changes that may be associated with broken glass or other forced entry. The motion sensor 14 may include infrared sensors to detect the presence of persons within the passenger cabin. The theft-deterrent system 12 may interface with door sensors to that indicate when a door is opened or closed.

The vehicle 10 may include various devices that may not traditionally be part of the theft-deterrent system 12 but that may be useful for enhancing the theft-deterrent function. The vehicle 10 may include various systems and sensors that may be described as a boundary alert system. The boundary alert system may include any vehicle sub-system that senses objects within a range or boundary surrounding the vehicle 10. For example, the boundary alert system may include one or more cameras 18, 20, 22, 24 that are part of various vehicle sub-systems. The cameras 18, 20, 22, 24, may be configured to provide a video signal when activated. The video signal may be displayed and further processed (e.g., for object detection). For example, a reverse parking aid (RPA) or backup monitoring system 26 may include a back-up camera 24 which provides video of an area behind the vehicle 10. The vehicle 10 may also include a forward-looking camera 18 that may be part of an Adaptive Cruise Control (ACC) and Collision Warning (CW) system 28 or a Lane-Departure Warning (LDW) system 30. Additional side-facing cameras 20, 22 may be part of a Blind Spot Warning System (BLIS) 32.

The boundary alert system may include one or more radar systems 34, 36, 38, 40 to detect objects in various positions around the vehicle 10. The radar systems 34, 36, 38, 40 may detect objects around the vehicle 10 and a relative motion of the objects. The radar system 34, 36, 38, 40 may operate by transmitting an electromagnetic wave and receiving a reflected electromagnetic wave from objects in the path of the transmitted electromagnetic wave. The output of the radar systems 34, 36, 38, 40 may include a presence of the object, a position of the object relative to the vehicle 10, and a relative velocity of the object. The ACC/CW system 28 may include a radar 34 that provides information associated with objects located in an area to the front of the vehicle 10. The BLIS 32 may include side-facing radars 36, 38. The backup-monitoring system 26 may include a rear-facing radar 40. The radar systems 34, 36, 38, 40 may detect motion of objects at a greater range than the proximity sensors 14 of the theft deterrent system 12. The radar systems 34, 36, 38, 40 may be configured to detect objects in front of the vehicle, behind the vehicle, and along the sides of the vehicle. The radar systems 34, 36, 38, 40 may be laser-based radar systems (e.g., lidar).

Electronic modules in the vehicle 10 may communicate via a vehicle network 60. The vehicle network 60 may include a plurality of channels for communication. One channel of the vehicle network 60 may be a serial bus such as a Controller Area Network (CAN). One of the channels of the vehicle network 60 may include an Ethernet network defined by Institute of Electrical and Electronics Engineers (IEEE) 802 family of standards. Additional channels of the vehicle network 60 may include discrete connections between modules and may include power signals from the vehicle battery 54. Different signals may be transferred over different channels of the vehicle network 60. For example, video signals may be transferred over a high-speed channel (e.g., Ethernet) while control signals may be transferred over CAN or discrete signals. The vehicle network 60 may include any hardware and software components that aid in transferring signals and data between modules.

The boundary alert system may include an ultrasonic sensor 42. The ultrasonic sensor 42 may be part of the backup monitoring system 26 or a front parking aid system. The ultrasonic sensing system 42 may detect objects within a predetermined range of the vehicle 10. The ultrasonic sensing system 42 may emit high-frequency sound waves and detect a signal reflected from an object.

The sensors associated with the boundary alert system may be referred to as boundary alert sensors. The boundary alert system may include various warnings and indicators. The warnings and indicators may include visual indicators such as lamps and a display 44. The warning and indicators may include one or more audible indicators 46. The audible indicators 46 may include speakers, buzzers, alarms, and horns. The warnings and indicators may include tactile indicators 48 that cause a vibration (e.g., steering wheel vibration). Various control elements such as relays or switching devices may be associated with the warning and indicators to allow control modules to modify the state of the warnings and indicators. The warnings and indicators may be configured to be sensed by persons external to the vehicle 10. For example, the vehicle 10 may include headlights 50 that may be utilized as an indicator. Additional lights that may be used include tail lights, brake lights, and dome lights. Some warnings and indicators may be configured to be sensed by persons that are in the vehicle 10.

The display 44 may be configured to display pictures and video from the cameras 18, 20, 22, 24. The display screen 44 may be located in a dashboard of the vehicle 10. In some configurations, the display screen 44 may be configured to display video from an active camera under certain conditions. For example, when a transmission of the vehicle 10 is in a reverse gear, video images from the backup camera 24 may be displayed. In some configurations, the video from the cameras 18, 20, 22, 24 may be displayed when the vehicle 10 is in a parked condition (e.g., transmission gear is PARK). In some configurations, the video signal may be displayed during a parking maneuver. In some configurations, the video signal that is displayed may be selected by an operator. In some configurations, display of video on the display 44 may be inhibited when the vehicle 10 is moving. In some configurations, the display screen 44 may be a touch screen device configured to accept input data and commands. In some configurations the display 44 may be a touchscreen display configured to allow user input by touching locations on a screen of the display.

In some configurations, the theft-deterrent system 12 may be activated when the vehicle 10 is locked. Locking of the vehicle 10 may be performed in a variety of ways. For example, inserting a key into the locking mechanism and rotating in a predetermined direction may lock the vehicle 10 and activate the theft deterrent system 12. In some configurations, the sensors of the theft-deterrent system 12 may be activated and monitored when the vehicle 10 is unlocked and unarmed.

The vehicle 10 may include one or more microphones 62. The microphone 62 may be located in the passenger cabin to receive sound from inside the vehicle 10. In some configurations, the microphone 62 may be configured to receive sound from outside of the vehicle 10. The microphone 62 may be incorporated into the boundary alert system to record sound during an event. Usage of the microphone 62 to record sounds in and around the vehicle may be limited by state laws.

The vehicle 10 may include a wireless communications module 56 to communicate with devices remote from the vehicle 10. The wireless communications module 56 may include an onboard modem having an antenna to communicate with off-board devices. The wireless communications module 56 may be a cellular communications device to enable communications via a cellular data network. The wireless communications module 56 may be configured to communicate according to the IEEE 802.11 standard. The wireless communications module 56 may be configured to utilize Bluetooth low energy (BTLE), dedicated short-range communication (DSRC) or any other standard wireless communication methods. The wireless communications module 56 may be configured to establish communication with a nomadic device (e.g., phone, tablet, computer). The nomadic device may be connected to an external network. The controller 58 may be programmed to implement an appropriate communications protocol in hardware and software that is compatible with a selected mode of wireless communication.

The boundary alert sensors may be activated and monitored via the wireless communications module 56. The operator may activate the boundary alert sensors using a nomadic device and establishing communication with the vehicle 10. Sensor data from the boundary alert sensors may be transmitted to the nomadic device.

The vehicle 10 may include a keyless entry system 52 that may referred to as a remote keyless entry (RKE) system or a Passive Entry-Passive Start (PEPS) system. The keyless entry system may include a low-frequency (LF) radio transceiver for PEPS fob detection and an ultra-high frequency (UHF) transceiver for communicating signals to and from a RKE key fob or a PEPS key fob. The keyless entry system 52 may utilize a radio frequency (RF) communications interface to wirelessly transmit and receive signals from a key fob 100. FIG. 1A depicts a key fob 100 that may be configured to interface with the keyless entry system 52 of the vehicle 10. The RF communication interface may be configured to provide limited distance communications with the vehicle 10. That is, the key fob 100 may directly communicate with the keyless entry system 52 when the key fob 100 is located within a predetermined distance of the vehicle 10. The RF communication interface may include associated circuitry and an antenna. The RF communication interface may include an associated controller to decode the RF messages and interface with the vehicle networks 60 to transfer the received message data to other modules. The associated controller may also receive information from the vehicle networks 60 to encode and send over the RF communication link.

The key fob 100 may include one or more buttons 102, 104, 106, 108 that perform a specific function. In some configurations, a first button 102 may cause transmission of an RF signal to lock one or more doors of the vehicle 10 and activate the theft-deterrent system 12. A second button 106 may cause transmission of an RF signal to unlock one or more of the doors of the vehicle 10 and deactivate the theft-deterrent system 12. A third button 104 may cause transmission of an RF signal to open a trunk or hatch of the vehicle 10. A fourth button 108 may cause transmission of an RF signal to start an engine of the vehicle 10. Various combinations and functions of the key fob buttons 102, 104, 106, 108 are possible and the examples cited are merely exemplary. A key fob 100 may be configured with more or fewer buttons than depicted and described. In configurations in which the key fob 100 is a smart PEPS key fob, the functions (e.g., lock, unlock) may be performed by the key fob 100 being in proximity with an appropriate vehicle zone or depressing release switches mounted on vehicle closures (e.g., handles, decklid, or other structures).

In some configurations, the key fob 100 may receive signals from the vehicle 10 and provide a display 110 or other indication (e.g., vibration, light) of the signal from the vehicle 10. Usefulness of this feature may depend upon being within the predetermined distance of the vehicle 10 over which the RF communication interface is effective.

The theft-deterrent system 12 may monitor the one or more proximity or motion sensors 14. The motion sensors 14 may detect motion of the vehicle 10 or motion of an object in the passenger cabin. The theft-deterrent system 12 may include a controller to monitor the motion sensors 14 to trigger the audible indicator 46 under certain conditions. For example, the detection of motion of the vehicle 10 may activate the horn continuously or with a predetermined on-off pattern. In some configurations, the detection of vehicle movement may trigger a controller to record video from one or more of the cameras 18, 20, 22, 24. In some configurations, the system may be configured to capture video before the actual alarm trigger to capture events leading up to the triggering of the alarm. In such a configuration, one or more of the cameras 18, 20, 22, 24 may be activated as part of the theft-deterrent system 12.

The theft-deterrent system 12 may draw power from a vehicle battery 54. As the theft-deterrent system 12 is active during key-off conditions, the amount of power used by the theft-deterrent system 12 should be minimized to prevent discharging the vehicle battery 54 below a predetermined level. As current is provided by the battery 54 (e.g., battery is discharging) a state of charge of the battery may decrease. The state of charge may represent an amount of energy stored in the battery. As the state of charge decreases, the battery voltage may decrease. As the state of charge and battery voltage decrease, the ability of the battery 54 to provide current is reduced. A prolonged interval without a key-on cycle combined with insufficient engine on-time or alternator current production may cause the vehicle battery 54 to discharge to a level at which sufficient current is no longer available to start the engine. It may be useful to reduce a key-off current load (KOL) during key-off/ignition-off situations to prevent a condition in which the engine cannot be started.

Although there may be benefit to utilizing the boundary alert sensors to enhance the theft-deterrent function, there are potential limitations. A system configured to utilize the additional cameras and sensors of the boundary alert system to record video and sensor data may increase the KOL. There may be a trade off in earlier collection of data and maintaining the KOL at a low level. For example, the cameras 18, 20, 22, 24 and other sensors may be powered on periodically or continuously during the key-off condition thereby increasing the KOL of the vehicle 10. The additional KOL associated with the boundary alert sensors may increase the risk that the engine cannot be started.

In addition to enhancing vehicle security, some configurations may utilize the boundary alert sensors for other purposes. The vehicle 10 may include a surveillance mode in which video from the cameras 18, 20, 22, 24 is displayed on the display screen 44. The surveillance mode may be useful for law enforcement activities. The surveillance mode may be enabled when the vehicle 10 is in a parked condition to avoid distraction while driving. The operator may select to enter the surveillance mode. During a key-off condition, the boundary alert sensors may be activated to detect moving objects near the vehicle 10. The movement may cause the video signal from one of the cameras 18, 20, 22, 24 to be displayed on the display screen 44.

In some configurations, the vehicle 10 may include a boundary alert function. The boundary alert function may operate by detecting movement in a particular area near the vehicle 10. For example, the front-facing radar 34 may be activated to detect movement in the area in front of the vehicle 10. When movement is detected, the audible indicator 46 or the visual indicator (e.g., lights 50) may be activated to alert persons nearby. Potential usage of the boundary alert function may be in a campground. The vehicle 10 may be placed facing a tent or other shelter. The boundary alert function may be activated to provide a virtual boundary around the shelter for which movement is to be detected. This may provide a warning to those inside the shelter as to intruders present in the area. This feature may also provide protection near a house or other structure. For example, when parked in a driveway of a house, the vehicle 10 may be facing a garage or shed.

These additional functions (surveillance and boundary alert) may be operated during an ignition-off condition and thereby increase the KOL of the vehicle 10. As additional boundary alert sensors are activated during the ignition-off condition, the potential for draining the vehicle battery 54 increases. Operating for prolonged periods with the boundary alert sensors and alert features activated may increase the KOL and increase the risk of a no-start condition.

FIG. 1A depicts a remote sensing device 200 that may be configured to interface with the vehicle 10. In order to minimize the risk of increasing KOL, it may be useful to utilize one or more remote sensors 200. The remote sensor 200 may be referred to as a remote sentinel (RS) device or module. The remote sentinel device 200 may include one or more object sensors 202 to detect objects near the RS device 200. The RS device 200 may also include a camera 204 to record video. The object sensor 202 may include a proximity sensor to detect the presence of objects near the RS device 200. The object sensor 202 may include an infrared sensor. The object sensor 202 may include a laser-based sensor. The object sensor 202 may include a radar system. The object sensor 202 may include any form of touchless sensor capable of detecting a nearby object. The object sensor 202 may be configured to detect the presence of the object as well as motion of the object.

The RS device 200 may include a controller 210 to process and manage signals within the RS device 200. The RS controller 210 may interface with the object sensors 202 and process signals from the object sensors 202. The RS controller 210 may include volatile and non-volatile memory for storing data.

The RS device 200 may interface with the vehicle 10 to enhance the detection of objects near the vehicle 10. The RS device 200 may be configured to detect an object and activate the vehicle 10 boundary alert sensors. In this manner, the boundary alert sensors of the vehicle 10 do not draw power from the vehicle battery 54 during the ignition-off condition until activated by the RS device 200. The boundary alert sensors may be activated when the vehicle 10 receives a signal from the RS device 200 that an object has been detected nearby. An added benefit of this configuration is that the RS device 200 can extend the detection range around the vehicle 10 and enhance the vehicle security function. Further, the direction in which objects are detected may be changed by adjusting an orientation of the RS device 200. Multiple RS devices 200 may be placed in various positions around a vehicle to provide detection zones that may not be possible with the vehicle 10 alone. For example, boundary alert sensors in the vehicle 10 may be obstructed by objects. The RS devices 200 may be placed in a position to avoid the obstructions. Further, the boundary alert sensors of the vehicle 10 may only activate upon detection of activity that is within the range of the sensors which may cause the sensor to miss capturing a portion of the activity. The off-board RS device 200 allows the boundary alert sensors of the vehicle 10 to be fully active before a potential thief has entered the vicinity of the vehicle 10 and its boundary alert sensors.

The RS device 200 may include a communications module 206 configured to communicate with the vehicle 10, additional RS devices 200, and other compatible devices (e.g., computers, phones, and tablets). The communication module may include wired and wireless communications. For example, the wired communications may include an Ethernet connection defined by the IEEE 802 family of standards. The wired communication interface may provide communication with other devices when connected. The communication module 206 may include a wireless network interface defined by the IEEE 802.11 standard. The wireless network interface may also employ other wireless communications solutions such as Wi-Max. The wireless network interface may also include a Bluetooth interface. A communication protocol that defines messages and message timing may be defined for communicating between the various devices. The RS controller 210 may interface with the communications module 206 to manage and control the operation of the communications module 206. The RS controller 210 may process messages received via the communications module 206 and may provide messages to be transmitted via the communications module 206. The RS device 200 may be configured to communicate with the vehicle 10 and remote or nomadic devices (e.g., phones, tablets, computers).

The communications module 206 may include a cellular communications device to enable communications via a cellular data network. The communications module 206 may be configured to establish communication with a nomadic device (e.g., phone, tablet, computer). The RS controller 210 may be programmed to implement an appropriate communications protocol in hardware and software that is compatible with a selected mode of communication.

During a key-off condition of the vehicle 10, the keyless entry system 52 may continue to be active. To provide communications during a key-off condition of the vehicle 10, the RS device 200 may include an RF communications interface 208 that is compatible with the keyless entry system 52 of the vehicle 10. The RF communications interface 208 may be configured to communicate with one or more RS devices 200 and the vehicle 10. The RS controller 210 may be coupled to the RF communications interface 208. The RS controller 210 may implement a message protocol for RF communications with the vehicle 10.

The RS device 200 may be placed or mounted at a distance from the vehicle 10. A maximum distance from the vehicle may be a function of the RF communication range and the RF signal transmission strength. The RS device 200 may monitor an area or zone for objects or movement. In some configurations, the RS device 200 may monitor a configurable zone. For example, the RS device 200 may be mounted to a wall and objects or movement may be detected in a predetermined area in front of the wall. The monitoring zone may include a predetermined arc radiating from the RS device 200 for a predetermined distance. In some configurations, the RS device 200 may monitor an area around the RS device 200. For example, an electric motor having a shaft coupled to the object sensor 202 may rotate the object sensor 202 to enable complete circular coverage about the RS device 200.

The RS device 200 may be mounted in a variety of ways. The RS device 200 may include a magnetic surface that is capable of coupling to a metal surface. The RS device 200 may include an adhesive backing for mounting. The RS device 200 may include slots for straps, pins, and tabs that allow for additional mounting options. The RS device 200 may be mounted on a post.

The RS device 200 may be coupled to a power source. The power source may be a battery which may be rechargeable or replaceable. In some configurations, the power source may include a solar panel to recharge the battery. In some configurations, the power source may be a standard electrical outlet. The RS device 200 may include additional circuitry to convert from alternating current (AC) inputs to direct current (DC) levels that may be utilized by the RS device 200. The power source may be electrically coupled to the various components of the RS device 200 and provide appropriate voltage and current levels to power the components.

The RS device 200 may be camouflaged to blend in with the environment in which it is placed. A housing of the RS device 200 may be formed in a variety of ways depending on the application. The RS device 200 may be disguised within other common objects in the environment. For example, the RS device 200 may be incorporated into a light bulb base such that power is drawn from the light bulb socket. The RS device 200 may include a light bulb socket to permit a light bulb to be installed (e.g., RS device 200 electrically in series with the light bulb and original socket). Such a configuration disguises the presence of the sensor and provides a motion-activate light.

The RS device 200 may further be configured with a camera 204. The RS controller 210 may interface with the camera 204 to receive video signals. The RS controller 210 may provide controls signals to the camera 204 to manage operation of the camera 204. Upon receiving signals from the object sensor 202 indicative of an object in the monitoring zone, the RS controller 210 may activate the camera 204 and transmit video information over the communication module 206. In some configurations, the camera 204 may be utilized as the object sensor 202. That is, the object sensor 202 may be a camera. The RS controller 210 may process video signals from the camera 204 to detect the presence of objects. The RS controller 210 may be configured to store video information in controller memory. The video information may be transmitted via the communication module 206 for a predetermined period of time. In some configurations, the video may be transmitted until the object is no longer detected in the monitoring zone. The video may be received by the vehicle 10 and displayed in the vehicle 10 to provide occupants with visual feedback in areas that may not be visible from the vehicle 10. The video may also be transmitted to the nomadic device. Such a configuration may allow a surveillance function in a vehicle 10 that is parked with the ignition off without increasing the KOL.

The RS controller 210 may monitor signals from the object sensor 202 to detect the presence of an object in the monitoring zone. When an object is detected in the monitoring zone, the RS controller 210 may initiate transmission of a signal or message via the RF communication interface 208 indicative of an object near the RS device 200. If the vehicle 10 is in RF communication range, it may receive the signal or message via the keyless entry system 52 interface. Upon receiving the message, the vehicle 10 may activate the boundary alert sensors.

The RS device 200 may be configured to allow an operator to activate a boundary alert sensor on the vehicle 10 via the nomadic device in the absence of any detected activity. For example, an operator may, through the nomadic device, activate the camera in the vehicle to check conditions near the vehicle 10. The operator may activate the camera to view snow accumulation, status of trash pick-up, or other routine uses unrelated to theft risk. The RS device 200 may communicate to the vehicle 10 via the communication module 206 and the RF interface 208. For example, the RS device 200 may wake the vehicle over the RF interface 208. The vehicle 10 may transmit video data via the wireless communications module 56. Depending on the particular configuration, the video data may be relayed by the RS device 200 or may be received by a nomadic device.

In some configurations, the vehicle 10 may be configured to transmit an arrival message via the RF communication interface 208 when entering a vicinity of the RS device 200. In response to receiving the arrival message, the RS device 200 may wake up and operate as described. Upon leaving the vicinity of the RS device 200 (e.g., drive-off of the vehicle 10), a departure message may be transmitted. In response to receiving the departure message, the RS device 200 may enter a low-power mode to prolong battery life. Upon returning to the vicinity of the RS device 200, the vehicle 10 may transmit the arrival message. The RS device 200 may be configured to wake up upon receiving the arrival message from the vehicle 10.

In response to receiving the signal indicative of the object near the RS device 200, a vehicle controller 58 may activate the boundary alert sensors. The vehicle controller 58 may include volatile and non-volatile memory for storing data from the boundary alert sensors. For example, in a configuration in which the boundary alert sensor is a camera 18, 20, 22, 24, the RS device 200 may allow earlier detection of the object so that video footage may be obtained at an earlier time. The vehicle controller 58 may activate the cameras 18, 20, 22, 24 in response to receiving the signal indicative of the object near the RS device 200. Video may be captured before the object causes activation of the theft-deterrent system 12. In this manner, video may be captured of the object that triggered the theft-deterrent system 12. In some configurations, the RS device 200 may not be placed within a line of sight of the vehicle 10. The RS device 200 may be placed around corners to detect objects approaching from various directions. The use of the RS device 200 may extend the range of the vehicle boundary alert system.

The use of the RS device 200 in conjunction with the boundary alert sensors of the vehicle 10 may find use in military or law enforcement applications. Various configurations of the RS device 200 and the vehicle 10 may include surveillance and monitoring capabilities. For example, a police car may be parked on a street a distance from an intersection. One or more RS devices 200 may be placed on a cross street running perpendicular to the street in which the police car is parked. The RS device 200 may detect vehicles approaching on the cross street. The RS devices 200 may transmit a signal to the police car via the RF communications interface 208.

The reception of the signal from the RS device 200 may also trigger activation of one or more of the radar systems 34, 36, 38, 40. The vehicle controller 58 may activate the radar systems 34, 36, 38, 40 in response to receiving the signal indicative of the object near the RS device 200. The police car may include an additional radar system configured for speed limit enforcement. When receiving the signal from RS device 200 that an object is in range, the additional radar system may be triggered to measure the speed of approaching vehicles. In addition, cameras 18, 20, 22, 24 in the 10 and the RS device 200 may be triggered to record video. The vehicle controller 58 may store video in non-volatile controller memory for later retrieval and processing. In the event of a speed violation, video of the driver and the vehicle may be available as further evidence. Such a configuration may be beneficial as the additional radar system is not detectable until the approaching vehicle is near, thereby rendering radar detection devices less useful.

Figure 2:
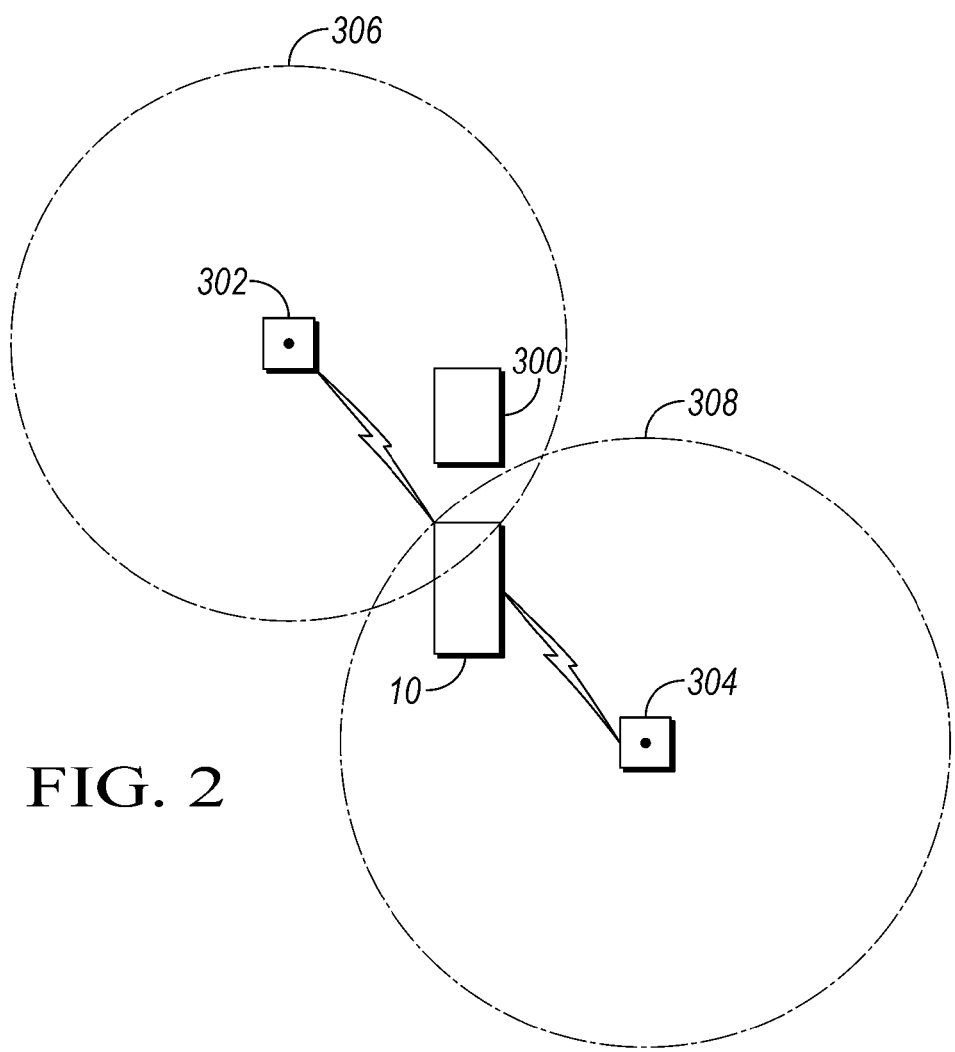
FIG. 2 depicts a possible configuration of multiple remote sensing devices located near a vehicle.

Other potential applications may include campsite security. FIG. 2 depicts a configuration of vehicle and RS devices 200 that may be used for a campsite security function. The vehicle 10 may be parked near a campsite 300. One or more RS devices 302, 304 may be placed around the campsite 300 to provide monitoring about the campsite 300. The RS devices 302, 304 may communicate with the vehicle 10 when movement of an object is detected around the campsite 300. For example, a first RS device 302 may monitor a first zone 306. A second RS device 304 may monitor a second zone 308. The first zone 306 and the second zone 308 may overlap. In addition, one or more of the first zone 306 and the second zone 308 may include the campsite 300 or the vehicle 10. In response to signals from the RS device module 302, 304, the vehicle 10 may record video, turn on headlights 50, or activate the audible indicator 46 to generate an audible alarm signal. Such a response may warn those at the campsite 300 as to movement around the campsite as well as ward off any potential intruders.

In some configurations, the RS device 200 may communicate directly with the nomadic device of the operator to notify the operator of any detected activity in the vicinity of the RS device 200. The operator may then elect to communicate with the vehicle 10 via the nomadic device to enable functions such as perimeter lighting, or camera/sensor activation. The nomadic device may include a processor that executes an application configured to interface with the RS device 200. The nomadic device may be used to configure operation of the RS device 200, receive status information from the RS device 200, and transmit commands to the RS device 200 intended for the RS device 200 and the vehicle 10.

The previous example was with reference to a campsite but the concept is easily extended to other applications. Other configurations may be used for household or property security. For example, the campsite 300 may be a house, a garage, or other structure or area for which monitoring is desired. One or more RS devices 200 may be placed in various locations around a house. For example, one RS device 200 may be placed in a back yard and another RS device 200 may be place in a front yard. The vehicle 10 may be parked in a driveway or in the street. The RS devices 200 may each monitor a predetermined zone near the house. As objects are detected, the RS devices 200 may transmit signals to the vehicle 10. When the vehicle 10 receives message that objects are detected by the RS devices 200, additional sensors and cameras of the vehicle 10 may be activated. In a household application, the signals may be integrated with a home security system via the keyless entry system 52 interface or the wireless communication interface 56. Video recorded by the vehicle 10 may be transferred over the wireless communication interface 56 to a computer or other device connected to the same network. The controller 58 may be programmed to output status via the remote communications module in response to receiving the object detected message from the RS devices 200. For example, an operator may receive status via a cellular network whenever the vehicle 10 is activated by the detection of an object.

Advantages of utilizing the RS devices 200 include earlier warning of moving objects (e.g., persons or vehicles) near the vehicle 10. The system also extends the sensing range further from the vehicle 10 so that movement in sensitive zones may be identified sooner. In addition, the boundary alert sensors of the vehicle 10 may be utilized without the vehicle in a key-on condition which reduces noise and reduces fuel consumption. Further, the boundary alert sensors may be effectively utilized without excessive KOL that may drain the battery. The RS device 200 may activate the vehicle boundary alert sensors via an RF transmission to the vehicle keyless entry system 52 since the RF receiver may be configured to be in listen mode when the vehicle is in a stationary or ignition-off condition.

In some configurations, the RS device 200 may include a repeater function. In some configurations, the RS devices 200 may be placed at increasingly further distances from the vehicle 10. In such configurations, each RS device 200 may be capable of receiving signals from the other RS devices 200 and re-transmitting them to the vehicle 10. This extends the communication range of the RS devices 200 and key fobs 100 and also extends the distance from the vehicle 10 that may be monitored.

Figure 3:
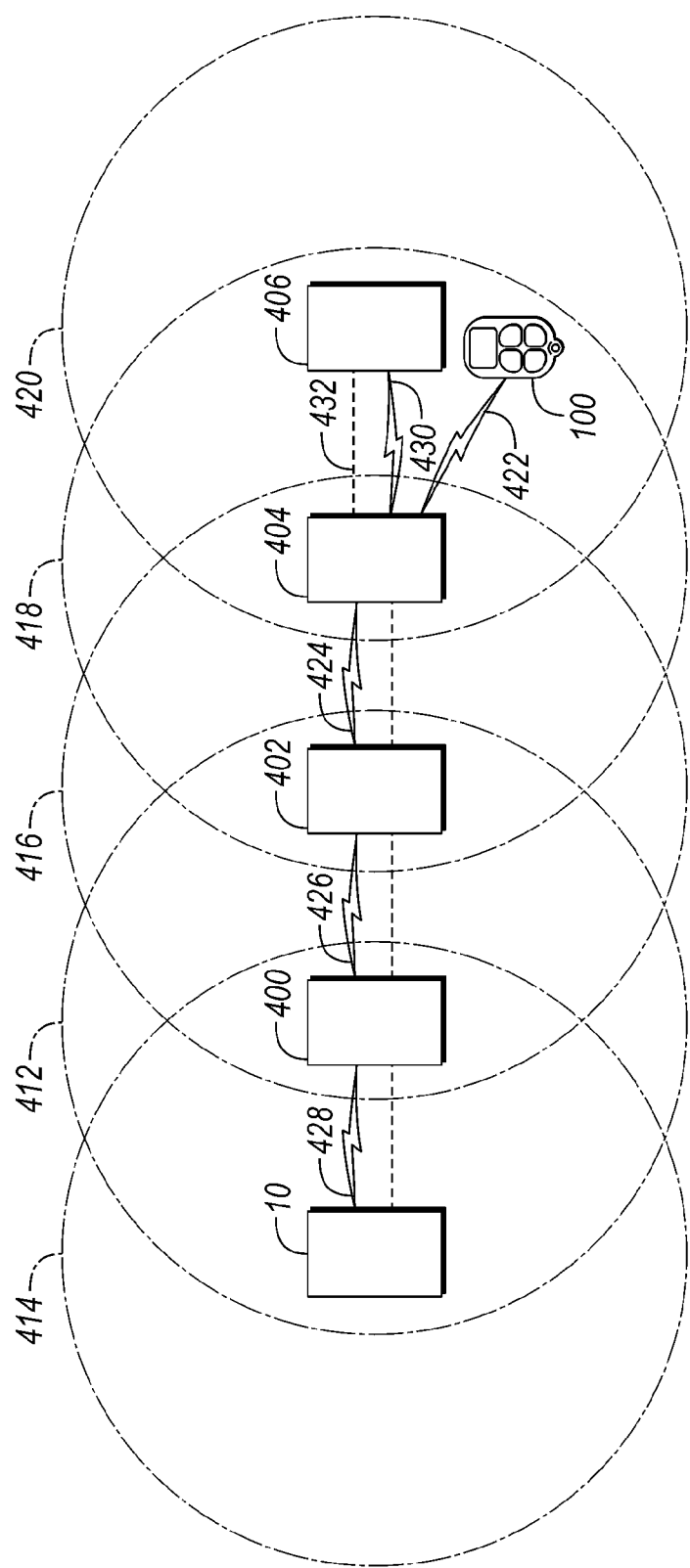
FIG. 3 depicts a possible configuration of multiple remote sensing devices configured in a repeating mode.

The repeater functionality may be useful in a parking lot application. A parking lot may be configured with multiple RS devices 200. FIG. 3 depicts a diagram for a possible configuration of RS devices 200 for a parking lot application. For example, a first RS device 400 may be located in the parking lot. The first RS device 400 may have a communication range that is effective in a first zone 412. In this example, the vehicle 10 is in this first zone 412 so that the first RS device 400 may communicate directly with the vehicle 10. The vehicle 10 may have a communication range that is effective within a second zone 414 such that the first RS device 400 is within the second zone 414. A second RS device 402 may be located a distance from the first RS device 400. The second RS device 402 may be located within the first zone 412 so that messages may be exchanged with the first RS device 400. The second RS device 402 may have a communication range that is effective within a third zone 416. A third RS device 404 may be located within the third zone 416 so that messages may be exchanged between the second RS device 402 and the third RS device 404. The third RS device 404 may have a communication range that is effective in a fourth zone 418. Within the fourth zone 418 an operator may utilize a remote computing device 406 having a communication range that is effective in a fifth zone 420. Additionally, the operator may be carrying the key fob 100 that has a communication range that is effective in the fifth zone 420. The third RS device 404 may be within the fifth zone 420. Note that the communication range of the vehicle (e.g., second zone 414) does not include the second RS device 402, the third RS device 404, the key fob 100, or the remote computing device 406. Note that additional RS devices may be placed in various configurations. In some configurations, a number of RS devices 200 may be placed in a grid such that a vehicle 10 may communicate with at least one of the RS devices 200. The communication zones are depicted as circles but the actual shape of the communication zone may vary based on terrain, antenna characteristics, and structures in the area.

A communication protocol for signals transmitted over the RF interface may be defined. Each of the RS devices 200 and the vehicle 10 may be assigned a unique identifier. Each RS device 200 may monitor the communication traffic within its communication range. In some configurations, the vehicle 10 may transmit an acknowledge message in response to receiving a message from the RS device 200. The RS devices 200 may monitor the acknowledgement messages to determine if the message should be relayed. If an RS device 200 receives a message from another RS device 200 but does not see an acknowledgement from the vehicle 10 in a predetermined time, the RS device 200 may attempt to retransmit the message from the other RS device 200. In this manner, the message may be repeated until it reaches the vehicle 10. Upon receiving the vehicle acknowledgement, the RS device 200 may re-transmit the acknowledgment message to relay it to the source RS device 200. Other communication protocols for relaying the messages are possible.

As an example of the parking lot repeater functionality, the operator may desire to start the engine using the key fob 100. The user may press a button the key fob 100 associated with a remote start. The key fob 100 may transmit a first RF signal over the keyless entry system interface. In this case, the first RF signal 422 may only be received by the third RS device 404 as it is the only RS device in the fifth zone 420. The third RS device 404 may receive the first RF signal 422 and may wait a predetermined time to determine if the first RF signal 422 was received by the vehicle 10. In this case, the vehicle 10 is not within the fifth zone 420 and will not receive the first RF signal 422. The third RS device 404 may then transmit the first RF signal 422 as a second RF signal 424. As the second RS device 402 is within the fourth zone 418, the second RS device may receive the second RF signal 424. The second RS device 402 may receive the second RF signal 424 and repeat it by outputting a third RF signal 426 that may be received by the first RS device 400. The first RS device 400 may receive the third RF signal 426 and repeat it by outputting a fourth RF signal 428 that may be received by the vehicle 10. The transfer of data between the vehicle 10 and the remote computing device 406 and the key fob 100 may be bi-directional. Messages from the vehicle 10 to the key fob 100 may follow a path in the opposite direction. In this example, the vehicle 10 may receive the fourth RF signal 428 and start the engine.

The relay function may also include relaying data via the wireless network interface of the communications module 206. For example, the operator may issue a command from a remote computing device 406 (e.g., computer, phone, or tablet) to provide video from the vehicle 10. The remote computing device 406 may be configured to output an RF signal 430 with the appropriate command. The RF signal 430 may be propagated through the RS devices 400, 402, 404 as described previously. The vehicle controller 58 may receive the command and activate one or more cameras 18, 20, 22, 24 on the vehicle 10. The video signals may be recorded on the vehicle 10. In some configurations, the video may be transmitted through the wireless communication module 56. The video data may be routed to the remote computing device 406 through the communications module of the RS devices 400, 402, 404. The video may be received by the remote computing device 406 and displayed. The effective range of the wireless network interface may be different from the RF communication interface. In FIG. 3, the wireless network in depicted with dashed lines. Propagation of the wireless network messages may be performed in any suitable manner.

The relay function of the RS device 200 extends the range of the RF interface of the keyless entry system 52. Extending the range of the RF interface allows for additional functionality. For example, a vehicle 10 may be remote started from a further distance when repeater functionality is deployed. Alarm signals from the vehicle 10 may be received over longer distances which enhances the alarm function. In addition, video from the vehicle may be received over the network via the communications modules 206 to enable an operator to view conditions around the vehicle 10.

The repeater function for a parking lot application may include multiple vehicles and multiple operators. The example described considered only one vehicle 10, but the concept is easily extendable to multiple vehicles. Additional data transmission security features may be incorporated into the RS devices 200 to ensure that the signals transferred are secure.

The RS device 200 may be configurable over the Bluetooth or wireless network established by the communications module 206. When a control device that includes Bluetooth is in range, the RS device 200 may establish communication with the control device. In some configurations, camera positioning and focusing may be adjusted. In some configurations, a time of day and week may be configured that specifies when the RS device 200 should actively monitor an area. In some configurations, the sensitively of the object detection in the RS device 200 may be adjusted. The RS device 200 may be configured with different vehicle wake up criteria.

In some configurations, a limit may be specified that indicates a maximum number of vehicle wakeups that may be issued in a predetermined amount of time. In some configurations, when the maximum number of vehicle wakeups is exceeded, the system may issue a remote start command to the vehicle 10 via transmission of a remote start signal through the RF communications interface 208. In some configurations, the remote start command may be issued automatically when waking the vehicle sensors. Some configurations may allow remote start of the vehicle 10 only with operator concurrence. For example, when the vehicle 10 is parked in a garage the operator may choose not to permit a remote start. Other configuration commands may include the ability to trigger vehicle system from the control device for testing purposes.

Figure 4:
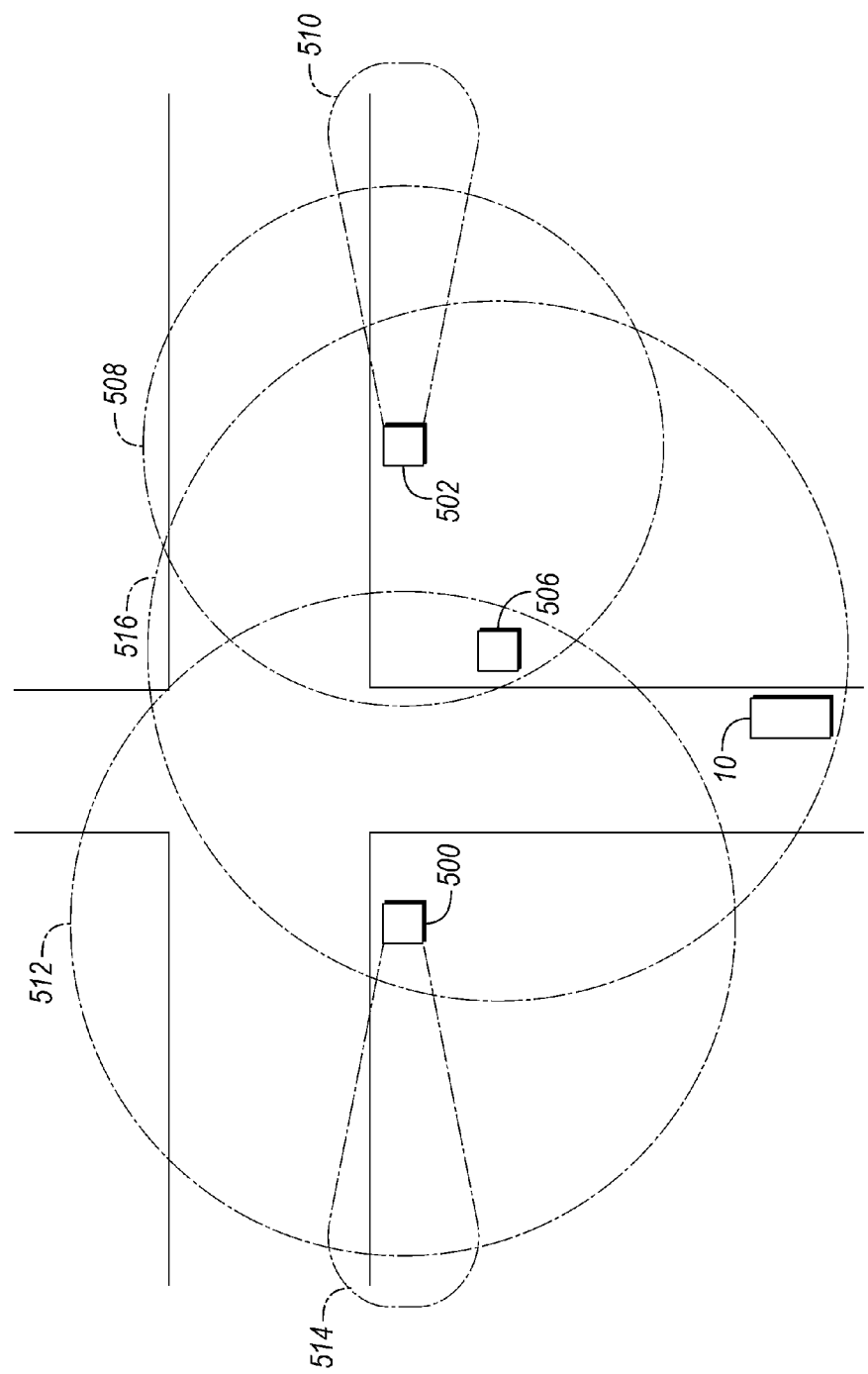
FIG. 4 depicts a possible configuration of multiple remote sensing devices configured to monitor an intersection.

FIG. 4 depicts a vehicle application for monitoring cross-traffic at an intersection or an area where full-view approach of vehicles or pedestrians is blocked by building, landscaping, signs, or other obstructions. The vehicle 10 may be a police car parked near an intersection. A first RS device 500 may be placed along a street that passes in front of the vehicle 10. The first RS device 500 may be configured to monitor a first zone 514. The first RS device 500 may have a RF communication effectiveness within a first range 512. A second RS device 502 may be placed along the street on an opposite side of the intersection. The second RS device 502 may be configured to monitor a second zone 510 and may have a RF communication effectiveness within a second range 508. A third RS device 506 may be placed near the intersection to act as a repeater to pass RF communication data between the vehicle 10 and the first RS device 500 and the second RS device 502. The third RS device 506 may have a RF communication effectiveness within a third range 516 that includes the vehicle 10, the first RS device 500, and the second RS device 502.

In some configurations, the first RS device 500, the second RS device 502, and the third RS device 506 may be permanently mounted on structures near the intersection. Such a configuration may allow continued monitoring of the intersection without having to manually place the RS devices for each usage. For example, the third RS device 506 may be mounted along with traffic lights or on a pole supporting traffic lights. The first RS device 500 and the second RS device 502 may be mounted on light poles within the area. In this configuration, a source of continuous power may be available to the RS device modules.

In some configurations, the operator may be able to establish communications with the RS device 200 via the communications module 206. For example, the nomadic device of the operator may be connected to a wireless network that includes the RS device 200. The operator may be able to select which boundary alert sensor(s) to activate and monitor. The operator may send commands to wake the vehicle 10 via the wireless network. The RS device 200 may transmit the commands to the vehicle 10 over through the RF communication module 208. The vehicle 10 may activate selected boundary alert sensors and transmit the data via the wireless communications module 56. The data may be received by the RS device 200 and transmitted to the operator. In some configuration, the data may be received by the nomadic device of the operator.

In some configurations, the vehicle 10 may have autonomous capabilities. That is, the vehicle may be configured to control propulsion and steering without driver intervention. The vehicle 10 may be configured to receive a command from the operator to move the vehicle 10 to a different location. The command may be received through the RS device 200 or the wireless communication module 56. The operator may send a new location as a relative position from the current position of the vehicle 10. In response to receiving the command, the controller 58 may issue commands to propulsion, braking and steering components to move the vehicle 10 to the new position. For example, the view of the cameras may be obstructed in the current position of the vehicle. The operator may send a command to reposition the vehicle 10 to avoid obstructing the cameras or other sensors.

The capability of the vehicle 10 to interface with RS device modules 200 opens up many possible applications. Applications for enhancing vehicle security are possible. Using the vehicle 10 to monitor and secure an area is also possible.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    a boundary alert sensor;
    a remote keyless entry system including a radio-frequency (RF) interface; and
    a controller programmed to, in response to the vehicle being in an ignition-off state and receiving a signal from a non-contact object detection sensor remote from the vehicle via the RF interface indicative of an object being within a predetermined range of the non-contact object detection sensor, activate the boundary alert sensor for a predetermined time interval.

2. The vehicle of claim 1 wherein the boundary alert sensor includes one or more of a microphone, a camera, a radar, an infrared sensor, and an ultrasonic sensor.

3. The vehicle of claim 1 wherein the controller is further programmed to store signals received from the boundary alert sensor for the predetermined time interval.

4. The vehicle of claim 1 further comprising an alerting device, and wherein the controller is further programmed to, in response to receiving the signal, activate the alerting device for a predetermined amount of time.

5. The vehicle of claim 4 wherein the alerting device includes one or more of a light and a horn.

6. The vehicle of claim 1 further comprising a wireless network interface and a display module, and wherein the controller is further programmed to, in response to receiving a video signal via the wireless network interface from the non-contact object detection sensor, activate the display module and display the video signal on the display module.

7. The vehicle of claim 1 further comprising a wireless network interface, and wherein the controller is further programmed to, in response to receiving a second signal via the RF interface indicative of a request for activation of the boundary alert sensor, activate the boundary alert sensor and output data from the boundary alert sensor via the wireless network interface.

8. A remote sentinel device comprising:
an object detection sensor;
a radio-frequency (RF) interface configured to communicate with a remote-keyless entry system of a vehicle; and
a controller programmed to, in response to a signal from the sensor indicative of an object being within a predetermined range of the object detection sensor, transmit a message to the vehicle via the RF interface to activate a boundary alert sensor of the vehicle.

9. The remote sentinel device of claim 8 wherein the object detection sensor is a camera, a radar, an infrared sensor, or an ultrasonic sensor.

10. The remote sentinel device of claim 8 wherein the controller is further programmed to, in response to receiving a remote sentinel message at the RF interface from a second remote sentinel device, transmit the remote sentinel message via the RF interface.

11. The remote sentinel device of claim 8 wherein the controller is further programmed to, in response to receiving a vehicle message at the RF interface from the vehicle, transmit the vehicle message via the RF interface.

12. The remote sentinel device of claim 8 further comprising a wireless network interface and a camera, wherein the controller is further programmed to, in response to the signal, activate the camera and transmit video data from the camera via the wireless network interface.

13. The remote sentinel device of claim 8 further comprising a wireless network interface, and wherein the controller is further programmed to, in response to receiving a wireless network message at the wireless network, transmit the wireless network message via the wireless network interface.

14. The remote sentinel device of claim 8 further comprising a wireless network interface, and wherein the controller is further programmed to, in response to receiving an activation message to activate the boundary alert sensor via the wireless network interface, transmit the activation message to the vehicle via the RF interface to activate the boundary alert sensor of the vehicle.

15. The remote sentinel device of claim 8 wherein the controller is further programmed to, in response to transmitting the message greater than a predetermined number of times in a predetermined time interval, transmit an engine start command to the vehicle via the RF interface to start an engine of the vehicle.

16. The remote sentinel device of claim 8 wherein the controller is further programmed to, in response to receiving a departure message from the vehicle via the RF interface indicative of the vehicle leaving a vicinity of the remote sentinel device, enter a low power mode to reduce power consumption.

17. A method of activating sensors of a vehicle comprising:
receiving, by at least one controller, a signal indicative of motion of an object within a predetermined range of a non-contact sensing device remote from the vehicle during a key-off condition of the vehicle; and
activating, by the at least one controller, one or more of the sensors of the vehicle for a predetermined time in response to the signal.

18. The method of claim 17 further comprising activating, by the at least one controller, a light, a horn, an audible indicator, or a visual indicator in response to the signal.

19. The method of claim 17 further comprising transmitting data from the one or more sensors of the vehicle via a wireless network interface.

20. The method of claim 17 further comprising storing, by the at least one controller, sensor data from the sensors of the vehicle for the predetermined time.

* * * * *